US012362517B2

(12) United States Patent
Inoue

(10) Patent No.: US 12,362,517 B2
(45) Date of Patent: Jul. 15, 2025

(54) CONNECTOR CAPABLE OF SUPPRESSING UNLOCKING OF MALE AND FEMALE CONNECTORS

(71) Applicant: SUMITOMO WIRING SYSTEMS, LTD., Mie (JP)

(72) Inventor: Yuta Inoue, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 402 days.

(21) Appl. No.: 17/915,355

(22) PCT Filed: Mar. 10, 2021

(86) PCT No.: PCT/JP2021/009455
§ 371 (c)(1),
(2) Date: Sep. 28, 2022

(87) PCT Pub. No.: WO2021/199981
PCT Pub. Date: Oct. 7, 2021

(65) Prior Publication Data

US 2023/0142085 A1 May 11, 2023

(30) Foreign Application Priority Data

Mar. 31, 2020 (JP) ................................ 2020-062182

(51) Int. Cl.
*H01R 13/62* (2006.01)
*H01R 13/52* (2006.01)
(Continued)

(52) U.S. Cl.
CPC ......... *H01R 13/6273* (2013.01); *H01R 13/52* (2013.01); *H01R 13/639* (2013.01)

(58) Field of Classification Search
CPC ........................ H01R 13/6273; H01R 13/5205
See application file for complete search history.

(56) References Cited

U.S. PATENT DOCUMENTS 4,431,244 A * 2/1984 Anhalt .............. H01R 13/6273 439/358
9,577,369 B2 * 2/2017 Suzuki .............. H01R 13/5208
(Continued)

FOREIGN PATENT DOCUMENTS

JP 2004-350342 A 12/2004
JP 2011-086509 A 4/2011
(Continued)

OTHER PUBLICATIONS

International Search Report issued on May 18, 2021 for WO 2021/199981 A1 (4 pages).

*Primary Examiner* — Neil Abrams
(74) *Attorney, Agent, or Firm* — Venjuris, P.C.

(57) ABSTRACT

A lock portion (19) projects on an outer surface of a receptacle (12). A housing (61) is fit into the receptacle (12). A lock arm (77) deflectably and deformably projects on an outer surface of the housing (61). The lock arm (77) locks the lock portion (19) while being in contact with an outer surface on an opening end side of the receptacle (12). A tip-side restricting portion (31) configured to come into contact with or proximately face a tip part (88) of the lock arm (77) is provided on the outer surface of the receptacle (12). A sealing member (90) is held in close contact with an inner surface on the opening end side of the receptacle (12).

5 Claims, 7 Drawing Sheets

(51) Int. Cl.
*H01R 13/627* (2006.01)
*H01R 13/639* (2006.01)

(56) References Cited

U.S. PATENT DOCUMENTS

2005/0245130 A1* 11/2005 Shiga ................. H01R 13/5208
439/587
2008/0003876 A1 1/2008 Fukaya et al.

FOREIGN PATENT DOCUMENTS

JP 2017-073300 A 4/2017
JP 2017-152190 A 8/2017

* cited by examiner

CONNECTOR CAPABLE OF SUPPRESSING UNLOCKING OF MALE AND FEMALE CONNECTORS

CROSS REFERENCE TO RELATED APPLICATIONS

This application is a national phase of PCT application No. PCT/JP2021/009455, filed on 10 Mar. 2021, which claims priority from Japanese patent application No. 2020-062182, filed on 31 Mar. 2020, all of which are incorporated herein by reference.

TECHNICAL FIELD

The present disclosure relates to a connector.

BACKGROUND

Patent Document 1 discloses a locking structure of a cover and a housing. The housing includes protrusions on both left and right side walls. The cover includes resilient deflection pieces at positions corresponding to the protrusions. By pushing the cover to the housing, the resilient deflection pieces lock the protrusions and the cover is retained and held on the housing. A locking structure of a cover and a housing is also disclosed in Patent Document 2 and Patent Document 3.

PRIOR ART DOCUMENT

Patent Document

Patent Document 1: JP 2004-350342 A
Patent Document 2: JP 2008-010340 A
Patent Document 3: JP 2017-073300 A

SUMMARY OF THE INVENTION

Problems to be Solved

It is considered to apply the above locking structure of the cover and the housing to a locking structure for holding both male and female housings in a connected state. For example, it is considered to provide a lock portion on an outer surface on an opening end side of a receptacle of the male housing and lock a lock arm of the female housing to the lock portion. However, there is a concern that the opening end side of the receptacle is deformed inwardly. Thus, there is a concern that the opening end side of the receptacle is deformed inwardly within a range of a clearance and a tip part of the lock arm is lifted up from the outer surface of the receptacle. As a result, the tip part of the lock arm is possibly easily contacted by a finger or the like and the locking of the lock arm and the lock portion may be accidentally released.

Accordingly, the present disclosure aims to provide a connector configured to avoid the unlocking of a lock arm and a lock portion.

Means to Solve the Problem

The present disclosure is directed to a connector with a female connector and a male connector connectable to each other, wherein the male connector includes a tubular receptacle and a lock portion projecting on an outer surface of the receptacle, the female connector includes a housing to be fit into the receptacle and a lock arm deflectably and deformably projecting on an outer surface of the housing, the lock arm locks the lock portion while being in contact with an outer surface on an opening end side of the receptacle, thereby holding the female connector and the male connector in a connected state, a tip-side restricting portion configured to come into contact with or proximately face a tip part of the lock arm is provided on the outer surface of the receptacle, and a sealing member is held in close contact with an inner surface on the opening end side of the receptacle.

Effect of the Invention

According to the present disclosure, it is possible to provide a connector configured to avoid the unlocking of a lock arm and a lock portion.

DETAILED DESCRIPTION TO EXECUTE THE INVENTION

Description of Embodiments of Present Disclosure

Figure 1:
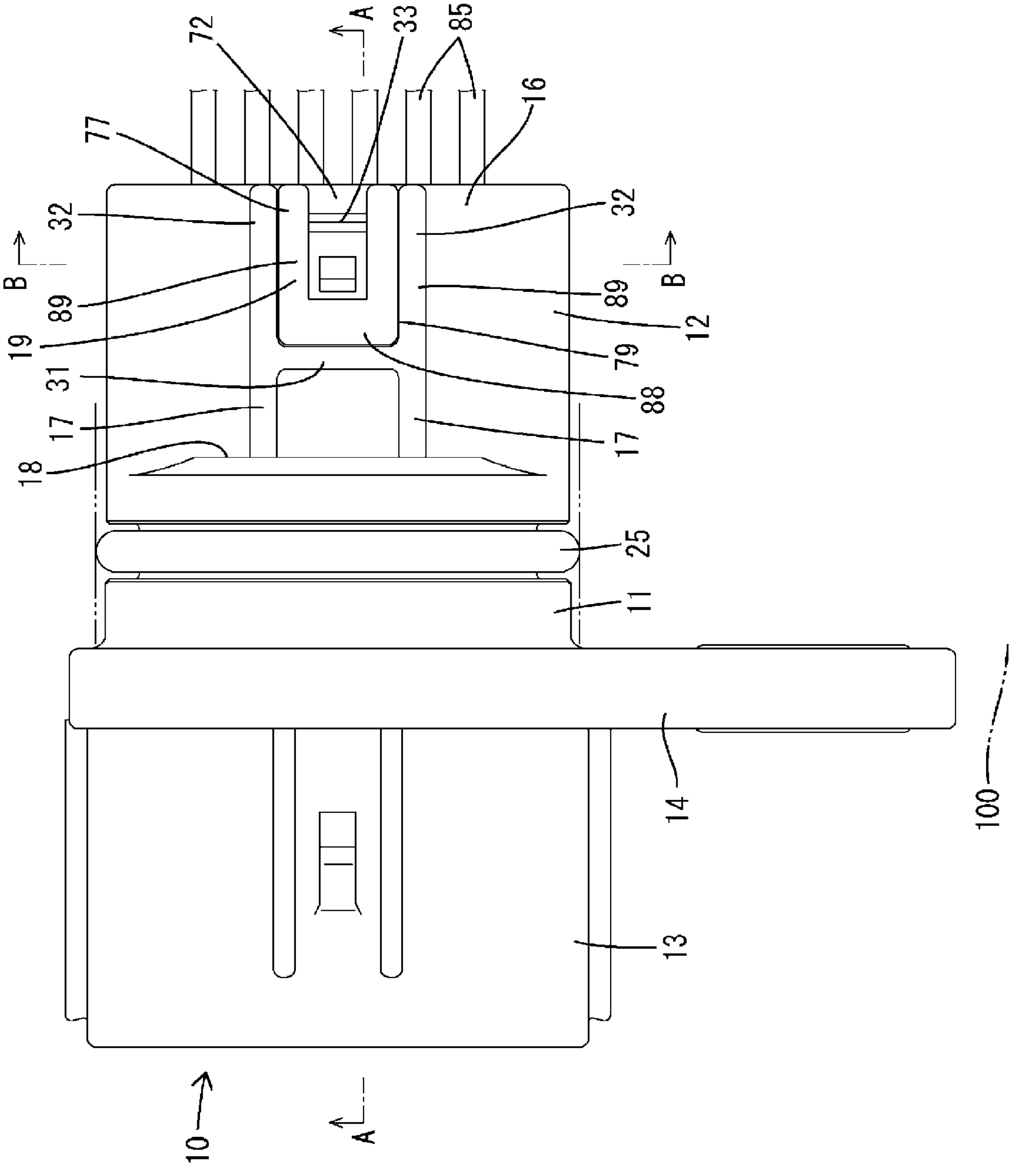
FIG. 1 is a plan view showing a state where a female connector and a male connector are properly connected to each other in a connector according to an embodiment.

First, embodiments of the present disclosure are listed and described.

(1) The connector of the present disclosure is provided with a female connector and a male connector connectable to each other, wherein the male connector includes a tubular receptacle and a lock portion projecting on an outer surface of the receptacle, the female connector includes a housing to be fit into the receptacle and a lock arm deflectably and deformably projecting on an outer surface of the housing, the lock arm locks the lock portion while being in contact with an outer surface on an opening end side of the receptacle, thereby holding the female connector and the male connector in a connected state, a tip-side restricting portion configured to come into contact with or proximately face a tip part of the lock arm is provided on the outer surface of the receptacle, and a sealing member is held in close contact with an inner surface on the opening end side of the receptacle.

According to the above configuration, since the tip-side restricting portion is in contact with or proximately facing the tip part of the lock arm with the lock arm locking the lock portion, it is possible to prevent the entrance of a finger or the like into a clearance between the tip part of the lock arm and the tip-side restricting portion. Further, since the sealing member is held in close contact with the inner surface on the opening end side of the receptacle to eliminate a clearance, inward deformation of the opening end side of the receptacle can be suppressed. Thus, the tip part of the lock arm can be suppressed from being lifted up from the outer surface of the receptacle. As a result, a situation where the locking of the lock arm and the lock portion is released by a finger or the like can be reliably prevented.

(2) Preferably, lateral restricting portions configured to come into contact with or proximately face side edge parts on both sides in a width direction of the lock arm are provided on the outer surface of the receptacle. According to this configuration, it is possible to prevent the entrance of a finger or the like into clearances between the lock arm and the lateral restricting portions. As a result, a situation where the locking of the lock arm and the lock portion is released by a finger or the like can be reliably prevented.

(3) The sealing member may include a plurality of sealing holes, penetrating members being inserted into the plurality of sealing holes in a liquid-tight manner. According to this configuration, by the penetrating members inserted into the sealing holes, inward deformation of the sealing member is suppressed and a pressure can be applied to the inner surface on the opening end side of the receptacle. As a result, inward deformation of the opening end side of the receptacle can be more reliably prevented. Note that the penetrating members include wires, holder lock portions, positioning portion and the like.

(4) The tip part of the lock arm may be at the same height or lower than the tip-side restricting portion in an in-out direction with the lock arm held in contact with the outer surface on the opening end side of the receptacle. According to this configuration, even if a finger or the like is forcibly inserted into between the tip part of the lock arm and the tip-side restricting portion, the tip part of the lock arm is hardly pulled up. Thus, a situation where the locking of the lock arm and the lock portion is released can be more reliably prevented.

Details of Embodiments of Present Disclosure

A specific example of an embodiment of the present disclosure is described below with reference to the drawings. Note that the present invention is not limited to these illustrations and is intended to be represented by claims and include all changes in the scope of claims and in the meaning and scope of equivalents.

Figure 2:
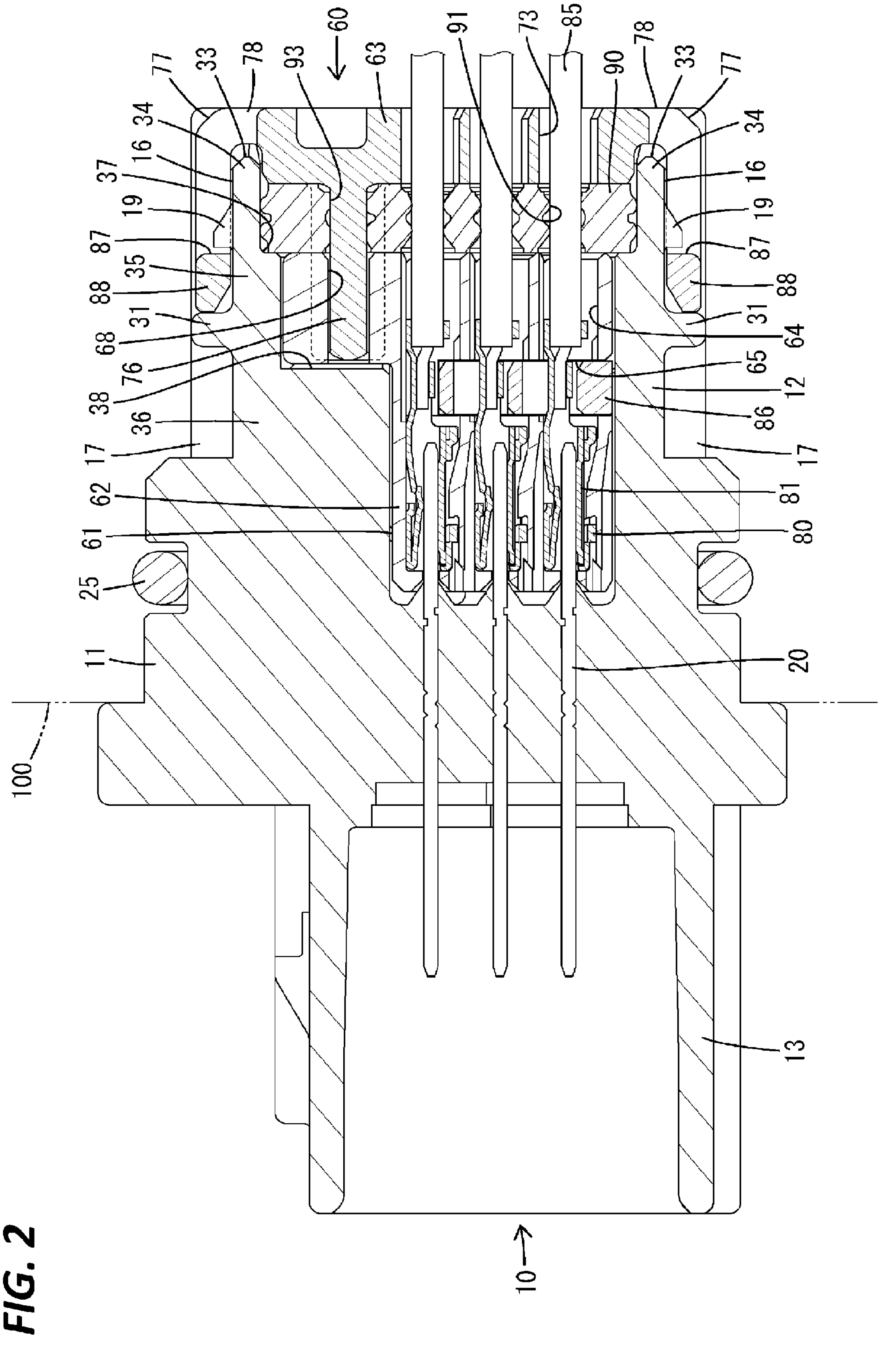
FIG. 2 is a section along A-A of FIG. 1.

A connector according to the embodiment includes a female connector 60 and a male connector 10 connectable to each other as shown in FIG. 2. The male connector 10 is fixed to a case of a device such as an automatic transmission of an automotive vehicle. Note that, in this specification, a connecting direction of the female connector 60 and the male connector 10 is described as a "front-rear direction". "Front sides" are surface sides facing each other when the connection of the female connector 60 and the male connector 10 is started. The front side of the female connector 60 is a side forward of the plane of FIG. 5 and a left side of FIG. 6. The front side of the male connector 10 is a side forward of the plane of FIG. 4. Concerning a "vertical direction", a side thickened via a step 38 to be described later is referred to as an upper side and an opposite side is referred to as a lower side. An upper side of each figure except FIG. 1 is an upper side. Further, a direction intersecting, specifically orthogonal to, both the "vertical direction" and the "front-rear direction" is defined as a "width direction". In each figure except FIGS. 1 and 2, a forward direction is represented by an "X direction", a rightward direction along the width direction when the female connector 60 and the male connector 10 are viewed from front is represented by a "Y direction" and an upward direction is represented by a "Z direction". Each direction is a direction for the convenience of description and does not limit a direction during assembling and during use.

<Male Connector>

As shown in FIG. 2, the male connector 10 includes a mounting portion 11 to be mounted on a case 100, a tubular receptacle 12 projecting forward from the mounting portion 11, a tubular second receptacle 13 projecting rearward from the mounting portion 11 and a plurality of male terminal fittings 20 mounted in the mounting portion 11 by insert molding. The mounting portion 11, the receptacle 12 and the second receptacle 13 are made of synthetic resin and constitute a housing part of the male connector 10. The male terminal fitting 20 is made of electrically conductive metal and configured as a busbar extending in the front-rear direction. A front part of the male terminal fitting 20 is arranged to project into the receptacle 12. A rear part of the male terminal fitting 20 is arranged to project into the second receptacle 13. The receptacle 12 is arranged inside the case 100 and fit to the female connector 60. The second receptacle 13 is arranged outside the case 100 and fit to an unillustrated external connector. The male connector 10 is configured as a relay connector.

Figure 4:
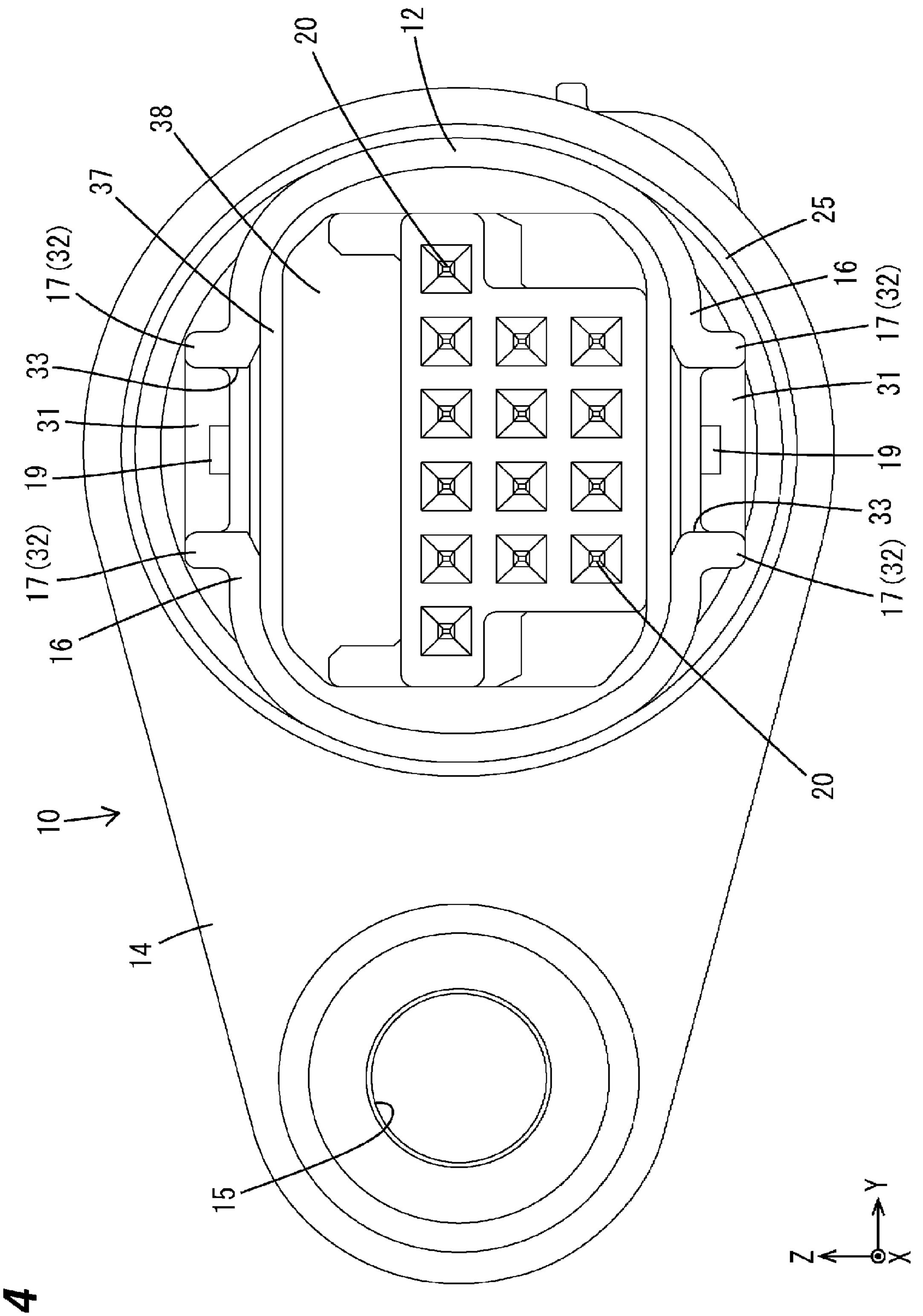
FIG. 4 is a front view of the male connector.

The mounting portion 11 has a cylindrical shape. A sealing ring 25 made of rubber is mounted on the outer surface of the mounting portion 11. The sealing ring 25 seals between the mounting portion 11 and the case 100 in a liquid-tight manner. As shown in FIG. 4, a mounting piece 14 protruding to one side (left side of FIG. 4) is continuous with the mounting portion 11. The mounting piece 14 is in the form of a plate piece having a plate thickness in the front-rear direction. A circular bolt hole 15 is provided to penetrate through the mounting piece 14 in the front-rear direction. The male connector 10 is fixed to the case 100 via an unillustrated bolt inserted through the bolt hole 15.

Figure 3:
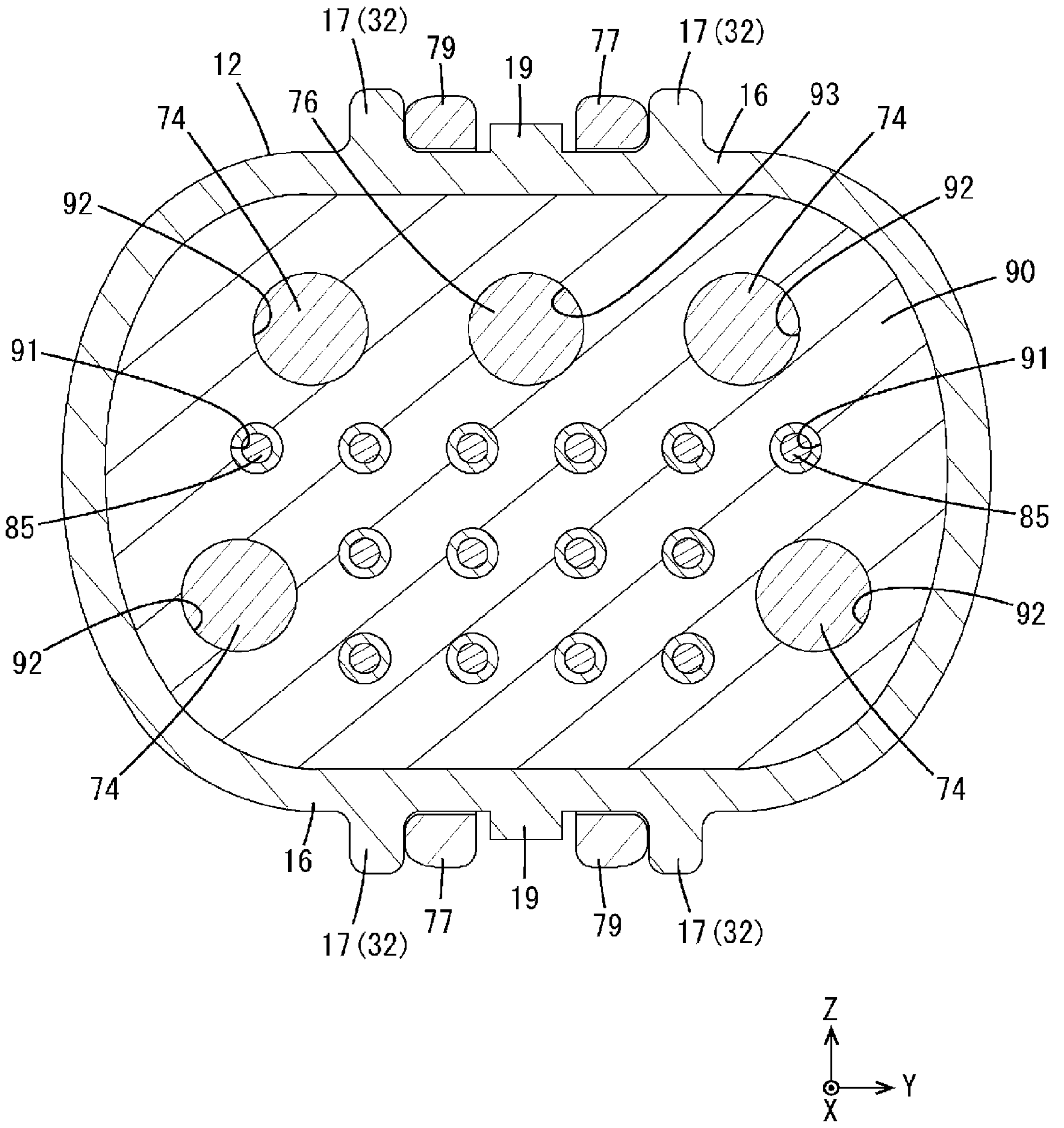
FIG. 3 is a section along B-B of FIG. 1.

As shown in FIGS. 3 and 4, the receptacle 12 has a tubular shape with four rounded corners and has flat upper and lower walls 16 along the width direction (lateral direction of FIGS. 3 and 4). A pair of guide portions 17 are provided on each of the upper and lower walls 16. As shown in FIG. 1, the respective guide portions 17 are in the form of ribs extending in the front-rear direction and are arranged in parallel to each other on both sides across central parts in the width direction of the outer surfaces of the upper and lower walls 16. Each guide portion 17 is provided from the front end (opening end) of the receptacle 12 to a stepped portion 18 continuous with the mounting portion 11.

As shown in FIGS. 3 and 4, a pair of lock portions 19 are provided between the respective guide portions 17 (guide portions 17 paired in the width direction) on the upper and lower walls 16. Each lock portion 19 is claw-like and projects in the central part in the width direction of the outer surface of the upper/lower wall 16. As shown in FIG. 2, the front surface of each lock portion 19 is inclined rearward. The rear surface of each lock portion 19 is arranged along the vertical direction.

A pair of tip-side restricting portions 31 project behind the respective lock portions 19 on the outer surfaces of the upper and lower walls 16. As shown in FIG. 1, the tip-side restricting portion 31 is in the form of a rib connected at a right angle to the respective guide portions 17 and extending in the width direction between the respective guide portions 17. When the male connector 10 is viewed from above or below, the respective guide portions 17 and tip-side restricting portion 31 form a H shape. The outer surface of the tip-side restricting portion 31 and those of the guide portions 17 are continuous without any step.

A part of each guide portion 17 from a position intersecting the tip-side restricting portion 31 to the front end (opening end) of the upper/lower wall 16 is configured as a lateral restricting portion 32.

A pair of cut portions 33 are provided forward of the respective lock portions 19 by recessing the front ends of the upper and lower walls 16. As shown in FIG. 4, the cut portion 33 is provided between the respective lateral restricting portions 32 (lateral restricting portions 32 paired in the width direction). Both ends in the width direction of the cut portion 33 are closed by rising ends of the respective lateral restricting portions 32.

As shown in FIG. 2, inner dimensions of the receptacle 12 are reduced in three stages from an opening end side to a back end side of the receptacle 12. The opening end side of the receptacle 12 includes a tip opening portion 34 and an intermediate opening portion 35 backward of the tip opening portion 34. The back end side of the receptacle 12 includes a back end portion 36. The lock portions 19 are provided on the upper and lower walls 16 of the intermediate opening portion 35. The tip side restricting portions 31 are provided on the upper and lower walls 16 of the intermediate opening portion 36. A step 37 is formed over an entire periphery between the tip opening portion 34 and the intermediate opening portion 35 in the receptacle 12. The large step 38 is formed in an upper part between the intermediate opening portion 35 and the back end portion 36 in the receptacle 12. A thickness of the receptacle 12 is reduced in the order of the back end portion 36, the intermediate opening portion 35 and the tip opening portion 34.

<Female Connector>

As shown in FIG. 2, the female connector 60 includes a housing 61, female terminal fittings 80 to be accommodated into the housing 61 and a sealing member 90. The housing 61 is made of synthetic resin and includes a housing body 62 and a holder 63 separable from and unitable with each other. The housing body 62 and the holder 63 are held in a united state across the sealing member 90. The female terminal fitting 80 is made of electrically conductive metal and a rear part thereof is connected to an end part of a wire 85. A tubular connecting portion 81 is provided in a front part of the female terminal fitting 80. A front part of the male terminal fitting 20 is inserted and connected to the connecting portion 81.

The housing body 62 includes a plurality of cavities 64. Each cavity 64 extends in the front-rear direction and is open in the front and rear surfaces of the housing body 62. The female terminal fitting 80 is inserted into the cavity 64 from behind. The housing body 62 is provided with a retainer mounting hole 65 communicating with each cavity 64. A retainer 86 is inserted into the retainer mounting hole 65 from below. The retainer 86 locks the female terminal fittings 80 inserted into the respective cavities 64. In this way, the female terminal fittings 80 are restricted from coming out from the cavities 64.

Figure 5:
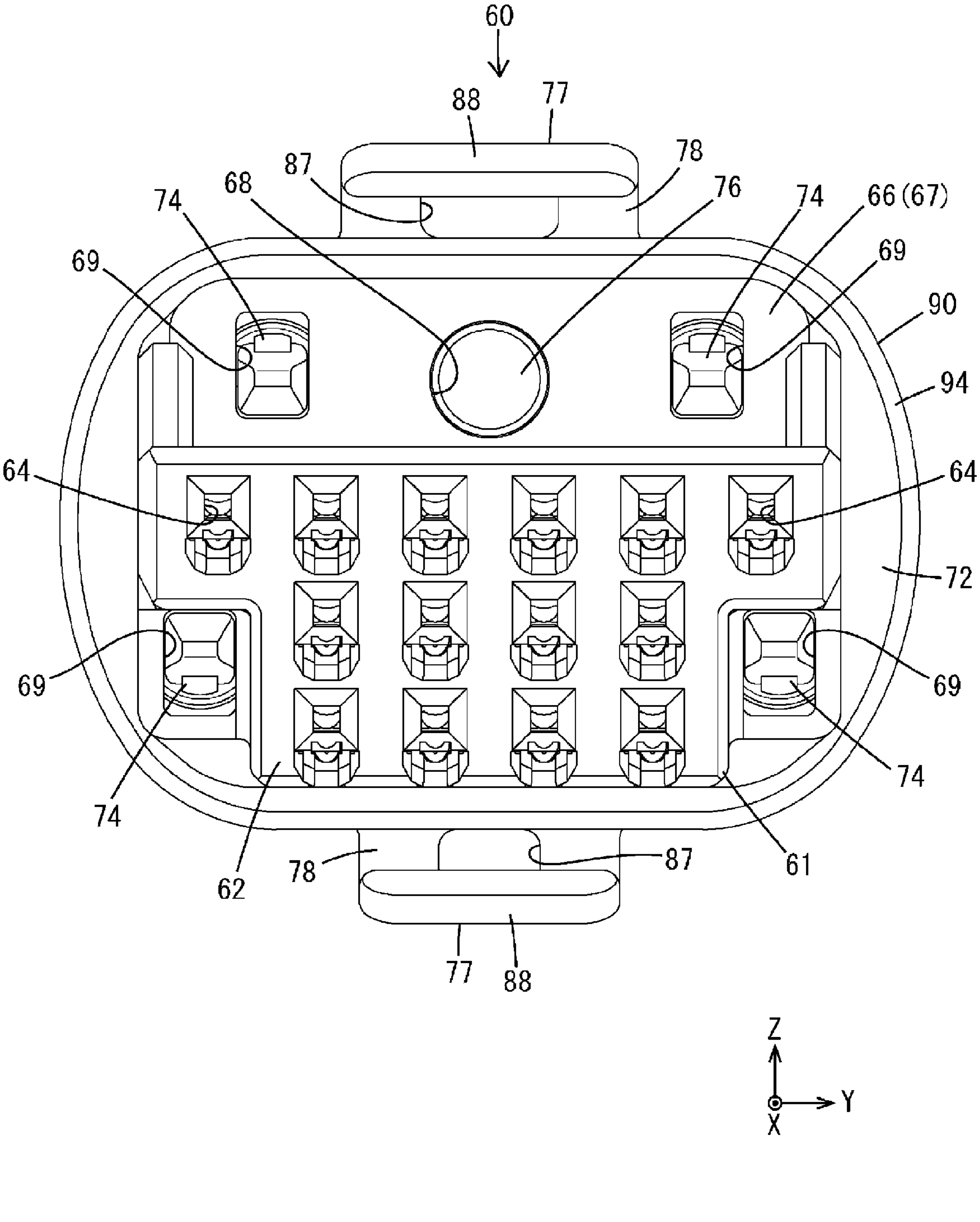
FIG. 5 is a front view of the female connector.
Figure 6:
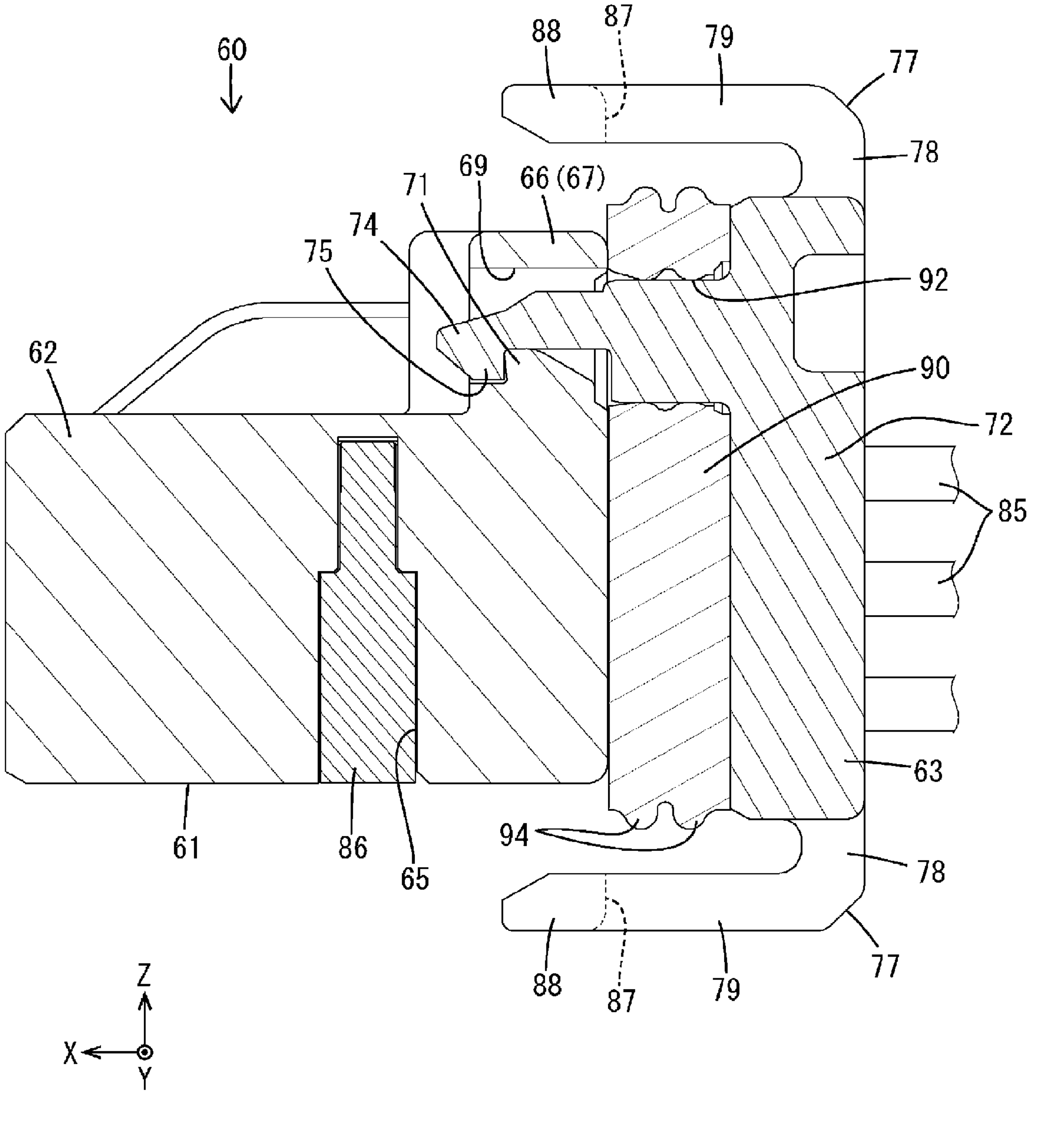
FIG. 6 is a side view in section of the female connector.

As shown in FIGS. 5 and 6, a back wall portion 66 is provided in a rear end part of the housing body 62. The back wall portion 66 closes the rear surface of the retainer mounting hole 65. The back wall portion 66 includes a rising wall portion 67 projecting further upward than the upper surface of a front part of the housing body 62. The rising wall portion 67 is in the form of a rectangular wall long in the width direction. As shown in FIG. 5, a circular through hole 68 is provided to penetrate in the front-rear direction through a central part in the width direction of the rising wall portion 67. A pair of rectangular locking holes 69 are provided to penetrate in the front-rear direction through both side parts in the width direction of the rising wall portion 67. As shown in FIG. 6, a claw-like locking projection 71 is provided on the inner wall of the locking hole 69.

As shown in FIG. 5, a front lower side of the housing body 62 is narrower than a front upper side. Both end parts in the width direction of a lower side of the back wall portion 66 are exposed forward of the housing body 61 due to the narrowing of the front lower side of the housing body 62. Locking holes 69 including locking projections 71 similar to the above ones are provided also in both end parts in the width direction of the lower side of the back wall portion 66. The cavities 64 in both end parts in the width direction of a front upper side of the housing body 62 are located above the locking holes 69.

The sealing member 90 is made of rubber such as silicon rubber and in the form of a mat having a certain thickness in the front-rear direction as shown in FIGS. 2 and 6. The front surface of the sealing member 90 is held in close contact with the rear surface of the housing body 62. The sealing member 90 includes a plurality of circular first sealing holes 91 at positions communicating with the respective cavities 64 as shown in FIG. 3. The sealing member 90 is configured as a one-piece rubber plug.

The sealing member 90 includes a plurality of second sealing holes 92 having a circular cross-section at positions communicating with the respective locking holes 69. The sealing member 90 includes a third sealing hole 93 having a circular cross-section at a position communicating with the through hole 68. As shown in FIG. 3, the second and third sealing holes 92, 93 have the same hole diameter, which is larger than that of the first sealing holes 91. The outer peripheral shape of the sealing member 90 is a rectangular shape with four rounded corners, similarly to the inner peripheral shape of the receptacle 12, and the upper and lower surfaces thereof are arranged along the width direction. A plurality of outer peripheral lips 94 are circumferentially provided on the outer surface of the sealing member 90 as shown in FIG. 6. The respective outer peripheral lips 94 are provided side by side in the front-rear direction on the outer surface of the sealing member 90. As shown in FIG. 5, the outer peripheral lip 94 of the sealing member 90 protrudes outwardly of the housing body 62 in a front view of the female connector 60.

Figure 7:
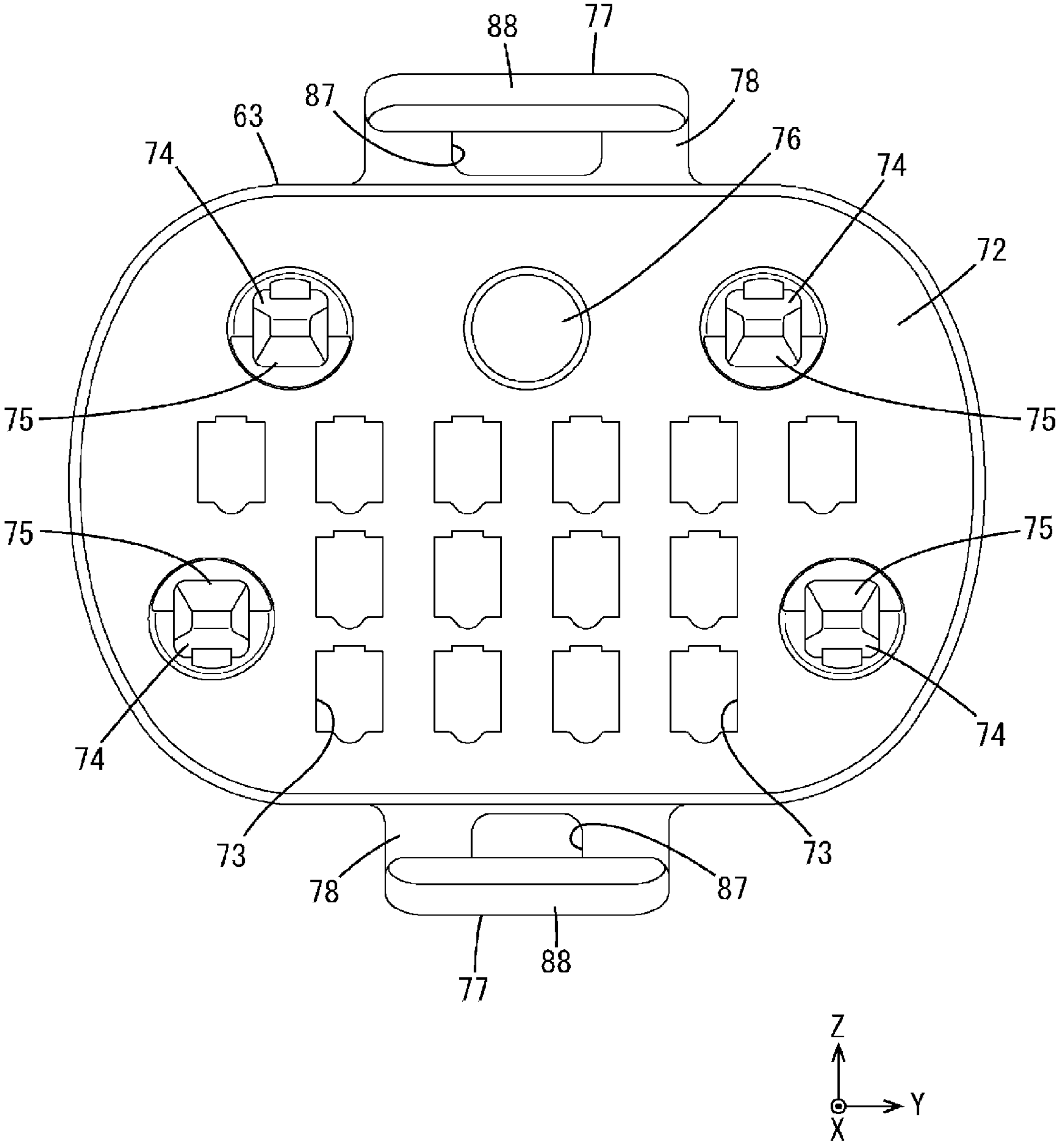
FIG. 7 is a front view of a holder.

The holder 63 is made of synthetic resin and includes, as shown in FIG. 6, a holder body 72 having a certain thickness in the front-rear direction. As shown in FIG. 7, the outer peripheral shape of the holder body 72 is similar to the outer peripheral shape of the sealing member 90 and the inner peripheral shape of the receptacle 12. As shown in FIG. 7, the holder body 72 includes a plurality of insertion holes 73 at positions communicating with the respective cavities 64 and the respective first sealing holes 91. Each insertion hole 73 has a rectangular opening shape corresponding to the connecting portion 81 of the female terminal fitting 80. A plurality of holder lock portions 74 are provided to project at positions corresponding to the respective locking holes 69 and the respective second sealing holes 92 on the front surface of the holder body 72. Each holder lock portion 74 includes a cylindrical base end part connected to a front surface side of the holder body 72 and a tip part having a claw-like holder projection 75 projecting on a front end. The holder projections 75 project downward from two holder lock portions 74 arranged on an upper side of the front surface of the holder body 72. The holder projections 75 project upward from two holder lock portions 74 arranged on a lower side of the front surface of the holder body 72.

A positioning portion 76 is provided to project at a position corresponding to the through hole 68 and the third sealing hole 93 on the front surface of the holder body 72. The positioning portion 76 has a cylindrical shape as a whole. A diameter of the positioning portion 76 is equal to that of the base end part of the holder lock portion 74.

As shown in FIG. 7, the holder body 72 includes a pair of lock arms 77 projecting from upper and lower surfaces. Each lock arm 77 is in the form of a plate piece along the width direction. Further, as shown in FIG. 6, each lock arm 77 is L-shaped in a side view and includes a rising portion 78 rising from a central part in the width direction of the upper/lower surface of the holder body 72 and a projecting portion 79 projecting forward from the tip of the rising portion 78 in a rising direction. Each lock arm 77 includes a lock hole 87 open from the rising portion 78 to the projecting portion 79. The projecting portion 79 of each lock arm 77 is gate-shaped and includes a tip part 88 along the width direction as shown in FIG. 1. The tip part 88 closes (defines) the front surface of the lock hole 87. A vertical thickness (height) of the projecting portion 79 of each lock arm 77 is constant as a whole and larger than that of each lock portion 19 and smaller those of the tip-side restricting portion 31 and the lateral restricting portions 32.

<Assembly Structure of Female Connector and Connection Structure of Female Connector and Male Connector>

In assembling the female connector 60, the holder 63 is mounted on the housing body 62 from behind with the sealing member 90 located therebetween. The positioning portion 76 is inserted from the third sealing hole 93 of the sealing member 90 to the through hole 68 of the back wall portion 66 (see FIG. 2). A base end part of the positioning portion 76 is inserted in the third sealing hole 93 in a liquid-tight manner. A tip part of the positioning portion 76 is tightly fit in the through hole 68. The holder lock portions 74 are inserted from the second sealing holes 92 of the sealing member 90 to the locking holes 69 of the back wall portion 66 (see FIG. 6). The base end parts of the holder lock portions 74 are inserted in the second sealing holes 92 in a liquid-tight manner. A space for allowing the tip part of the holder lock portion 74 to be deflected and deformed is secured in the locking hole 69. The holder projections 75 of the holder lock portions 74 are locked to the locking projections 71 of the respective locking holes 69. In this way, the holder 63 is locked and fixed to the housing 61. The sealing member 90 is sandwiched between the housing 61 and the holder 63 to be retained and held.

Subsequently, each female terminal fitting 80 is inserted into the cavity 64 from the insertion hole 73 by way of the first sealing hole 91 from behind the housing 61. If the female terminal fitting 80 is properly inserted into the cavity 64, the wire 85 is inserted in the first sealing hole 91 in a liquid-tight manner. Thereafter, the retainer 86 is inserted with a proper depth into the retainer mounting hole 65 and the female terminal fittings 80 are retained in the cavities 64 (see FIG. 2).

In starting a connecting operation of the female connector 60 and the male connector 10, the female connector 60 and the male connector 10 are directly opposed to each other. In that state, the housing 61 is fit into the receptacle 12. In a fitting process of the housing 61, the tip parts 88 of the lock arms 77 slide on the lock portions 19 and the projecting portions 79 of the lock arms 77 are deflected and deformed (tilted and deformed) outward with the rising portions 78 as fulcrums. When the housing 61 is properly fit into the receptacle 12, the lock arms 77 resiliently return and the projecting portions 79 come into contact with the outer surfaces of the upper and lower walls 16 of the receptacle 12. As the lock arms 77 resiliently return, the lock portions 19 are fit into the lock holes 87. In this way, the housing 61 is held in the receptacle 12 with separation restricted.

With the housing 61 properly fit in the receptacle 12, the front part of the housing body 62 is fit in the back end part 36 of the receptacle 12 as shown in FIG. 2. The back wall portion 66 is fit in the intermediate opening portion 35 of the receptacle 12. The rising wall portion 67 is arranged to be able to come into contact with the step 38. The sealing member 90 is fit into the tip opening portion 34 of the receptacle 12. An outer peripheral edge part of the front surface of the sealing member 90 is arranged to be able to come into contact with the step 38. Each outer peripheral lip 94 of the sealing member 90 is held in close contact with the inner surface of the tip opening portion 34 of the receptacle 12 over an entire periphery. In this way, liquid-tight sealing is provided between the housing 61 and the receptacle 12.

With the housing 61 properly fit in the receptacle 12 and the lock arms 77 locking the lock portions 19, the rising portions 78 of the lock arms 77 enter the cut portions 33 of the receptacle 12. As shown in FIG. 1, the tip part 88 of the lock arm 77 and the tip-side restricting portion 31 are arranged to abut on each other in the front-rear direction. No clearance is formed between the tip part 88 of the lock arm 77 and the tip-side restricting portion 31. Further, side edge parts 89 on both sides in the width direction of the lock arm 77 and the lateral restricting portions 32 are arranged to abut on each other in the width direction. No clearance is formed between the side edge parts 89 of the lock arm 77 and the lateral restricting portions 32. That is, the outer periphery of the projecting portion 79 of the lock arm 77 is entirely arranged to contactably face the tip-side restricting portion 31 and the lateral restricting portions 32.

By the above, if the lock arm 77 is inadvertently pulled up when the female connector 60 and the male connector 10 are in a connected state, the lock portion 19 comes out from the lock hole 87 and the locked state of the lock arm 77 and the lock portion 19 cannot be maintained. However, according to this embodiment, since no clearance is formed between the tip part 88 of the lock arm 77 and the tip-side restricting portion 31, there is no room for a finger or the like between the tip part 88 of the lock arm 77 and the tip-side restricting portion 31. Further, since no clearance is formed between the side edge parts 89 of the lock arm 77 and the lateral restricting portions 32, there is also no room for a finger or the like between the side edge parts 89 of the lock arm 77 and the lateral restricting portions 32. Furthermore, a height of the projecting portion 79 including the tip part 88 of the lock arm 77 is lower than those of the tip-side restricting portion 31 and the lateral restricting portions 32. Thus, even if a finger or the like touches the tip part 88 of the lock arm 77, the lock arm 77 cannot be pulled up and the locking of the lock arm 77 and the lock portion 19 can be satisfactorily maintained.

Although the opening end side of the receptacle 12 is formed to be thin and, particularly, the tip opening portion 34 of the receptacle 12 is thinnest, inward deformation of the receptacle 12 can be suppressed even if the receptacle 12 receives a locking force of the lock arm 77 since the sealing member 90 is held in close contact with the inner surface of the tip opening portion 34 of the receptacle 12 and the inside of the tip opening portion 34 of the receptacle 12 is tightly filled up by the sealing member 90. Then, the wire 85 is inserted into each first sealing hole 91 in a liquid-tight manner, each holder lock portion 74 is inserted into each second sealing member 92 in a liquid-tight manner and the positioning portion 76 is inserted into the third sealing hole 93 in a liquid-tight manner, whereby an inward resilient displacement of the sealing member 90 is suppressed and, consequently, inward deformation of the receptacle 12 is also effectively suppressed. As a result, the lock arms 77 are not lifted up from the outer surface of the receptacle 12 in association with inward deformation of the receptacle 12, and the lock arms 77 can be more reliably prevented from being inadvertently pulled up.

Other Embodiments of Present Disclosure

The embodiment disclosed this time should be considered illustrative in all aspects, rather than restrictive.

Although the lock arm is provided on the holder in the case of the above embodiment, the lock arm may be provided on the housing body (part including the cavities capable of accommodating the female terminal fittings) as another embodiment.

Although the pair of lock arms are provided on the upper and lower surfaces of the housing in the case of the above embodiment, the lock arm may be provided on either one of the upper and lower surfaces of the housing as another embodiment.

Although the sealing member is a one-piece rubber plug including the plurality of sealing holes in the case of the above embodiment, the sealing member may be a sealing ring to be mounted on the outer surface of the housing body as another embodiment.

Although the male connector is configured as a relay connector in the case of the above embodiment, the male connector may include one receptacle and the rear end parts of the male terminal fittings may be connected to a circuit board or wires as another embodiment.

Although the tip part of the lock arm and the tip-side restricting portion are arranged in contact with each other in the case of the above embodiment, the tip part of the lock arm and the tip-side restricting portion may be proximately arranged at a distance from each other as another embodiment. In this case, the tip part of the lock arm and the tip-side restricting portion may be so proximate to each other that a finger or the like does not enter a clearance therebetween.

Although the side edge parts of the lock arm and the lateral restricting portions are arranged in contact with each other in the case of the above embodiment, the side edge parts of the lock arm and the lateral restricting portions may be proximately arranged at a distance from each other as another embodiment. In this case, the side edge parts of the lock arm and the lateral restricting portions may be so proximate to each other that a finger or the like does not enter clearances therebetween.

LIST OF REFERENCE NUMERALS

10 . . . male connector
11 . . . mounting portion
12 . . . receptacle
13 . . . second receptacle
14 . . . mounting piece
15 . . . bolt hole
16 . . . upper/lower wall
17 . . . guide portion
18 . . . stepped portion
19 . . . lock portion
20 . . . male terminal fitting
25 . . . sealing ring
31 . . . tip-side restricting portion
32 . . . lateral restricting portion
33 . . . cut portion
34 . . . tip opening portion
35 . . . intermediate opening portion
36 . . . back end part
37, 38 . . . step
60 . . . female connector
61 . . . housing
62 . . . housing body
63 . . . holder
64 . . . cavity
65 . . . retainer mounting hole
66 . . . back wall portion
67 . . . rising wall portion
68 . . . through hole
69 . . . locking hole
71 . . . locking projection
72 . . . holder body
73 . . . insertion hole
74 . . . holder lock portion
75 . . . holder projection
76 . . . positioning portion
77 . . . lock arm
78 . . . rising portion
79 . . . projecting portion
80 . . . female terminal fitting
81 . . . connecting portion
85 . . . wire
86 . . . retainer
87 . . . lock hole
88 . . . tip part
89 . . . side edge part
90 . . . sealing member
91 . . . first sealing hole
92 . . . second sealing hole
93 . . . third sealing hole
94 . . . outer peripheral lip
100 . . . case

What is claimed is:

1. A connector, comprising a female connector and a male connector connectable to each other, wherein:
the male connector includes a tubular receptacle and a lock portion projecting on an outer surface of the receptacle,
the female connector includes a housing to be fit into the receptacle and a lock arm deflectably and deformably projecting on an outer surface of the housing,
the lock arm locks the lock portion while being in contact with an outer surface on an opening end side of the receptacle, thereby holding the female connector and the male connector in a connected state,
a tip-side restricting portion configured to come into contact with or proximately face a tip portion of the lock arm is provided on the outer surface of the receptacle,
a seal is held in close contact with an inner surface on the opening end side of the receptacle, and
lateral restricting portions configured to come into contact with or proximately face side edge portions on both sides in a width direction of the lock arm are provided on the outer surface of the receptacle.

2. The connector of claim 1, wherein the seal includes a plurality of sealing holes, penetrating portions being inserted into the plurality of sealing holes in a liquid-tight manner.

3. The connector of claim 1, wherein the tip portion of the lock arm is at the same height or lower than the tip-side restricting portion in an in-out direction with the lock arm held in contact with the outer surface on the opening end side of the receptacle.

4. A connector, comprising a female connector and a male connector connectable to each other, wherein:

the male connector includes a tubular receptacle and a lock portion projecting on an outer surface of the receptacle, the female connector includes a housing to be fit into the receptacle and a lock arm deflectably and deformably projecting on an outer surface of the housing, the lock arm locks the lock portion while being in contact with an outer surface on an opening end side of the receptacle, thereby holding the female connector and the male connector in a connected state, a tip-side restricting portion configured to come into contact with or proximately face a tip portion of the lock arm is provided on the outer surface of the receptacle, a seal is held in close contact with an inner surface on the opening end side of the receptacle, and the seal includes a plurality of sealing holes, penetrating portions being inserted into the plurality of sealing holes in a liquid-tight manner.

5. The connector of claim 4, wherein the tip portion of the lock arm is at the same height or lower than the tip-side restricting portion in an in-out direction with the lock arm held in contact with the outer surface on the opening end side of the receptacle.

* * * * *